May 6, 1952     S. ABDALLAH ET AL     2,595,436

AUTOMOBILE DOOR SAFETY LATCH

Filed Jan. 26, 1949

INVENTORS
SUBREY ABDALLAH
FLORENCE A. ABDALLAH
BY Philip M. Stutrud
ATTORNEY

Patented May 6, 1952

2,595,436

UNITED STATES PATENT OFFICE 2,595,436

AUTOMOBILE DOOR SAFETY LATCH

Subrey Abdallah and Florence A. Abdallah, Minneapolis, Minn.

Application January 26, 1949, Serial No. 72,884

1 Claim. (Cl. 292—204)

This invention relates to automobile door safety latches, which are adapted to any door arrangement, are hand operated from the outside, and may be applied and removed without any damage to the automobile.

Door locking mechanisms and latches have been devised for automobiles, but these have either involved complicated inter-connected mechanisms, which are expensive and difficult to install, or depend upon and are limited to use with a mid-post or pillar. This kind of door arrangement with both doors closing on the midpost, appears to be on its way out. The common handle latch, with which automobiles are equipped, can be quite easily operated by children within the car. There is therefore need for a simple device, which may be economically manufactured and which may be adapted to any door arrangement, to safeguard the lives of children.

An important object of our invention is to safeguard the lives of children, who may be in an automobile unattended except for the driver, by providing a safety latch, which is adapted to any door arrangement.

Another important object is to provide such a latch, which may be hand operated from the outside, and which is not complicated, but may be economically manufactured.

Another object is to provide such a latch, which is not closely limited to a particular location on a door, but may be applied without change in the existing arrangement, and may be applied and removed without damage to the automobile.

Other objects will be apparent from the description and appended claim.

For a full disclosure of our invention, reference is made to the description following and to the drawing, in which—

Figure 1:
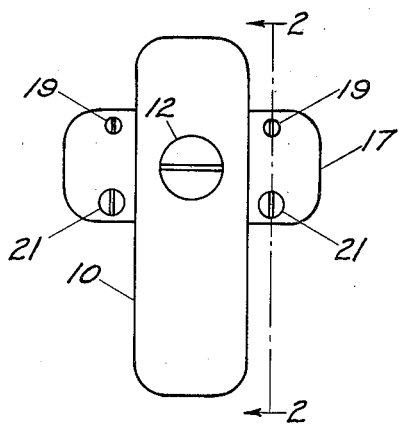
Fig. 1 is a front elevation view of a preferred form of our safety latch for automobile doors which is to be clamped to the drain channel on the automobile body.

Referring now to the several figures of the drawing, the reference character 10 indicates a door latching member. The longer end of this member engages the outside of the door. A resilient pad 11 of rubber or the like is provided on the longer end of the latching member, where it comes in contact with the door in its latching position, so it will not mar the door. This pad is arranged to clear the other construction of the latch, when turned to neutral or non-engaging positions. Additional thicknesses of the pad are provided to extend same, where required. These thicknesses are treated with cementing materials under a tear-off covering and are easily applied. A pivot pin 12 secures the latching member to a body attaching member. This pin preferably has a smooth portion on which the latching member turns, and a head on the pin retains the latching member thereon. It is secured to a body attaching member by a screw threaded engagement. The latching member is easily turned by hand, and to define its respective active and neutral positions, hemispherical recesses 13 are provided on the under side of the latching member. These recesses are located on the arc of a circle of which the pin 12 is the center. A ball 14 is forced into engagement with these recesses by a spring 15, as the latching member is revolved to register positions. Logically, a neutral position at 90° to the right and left of the door engaging position is provided. A cylindrical recess 16, in a body attaching member, accommodates the spring 15. The registering in position is definite and firm, so children cannot disturb same, in case they might be able to reach same through an open window. Still, the latch is readily yieldable to the hand of an adult.

Figure 2:
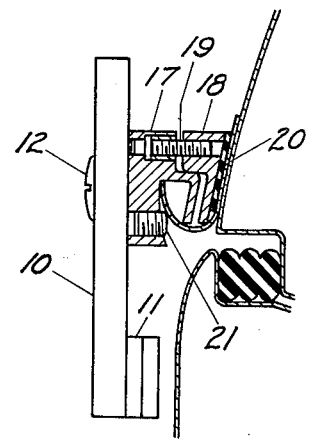
Fig. 2 is a sectional view thereof, taken on the line 2—2 of Fig. 1, with a fragmentary sectional view of automobile body and door, showing latch clamped to the drain channel and in engaging position with respect to the door.
Figure 3:
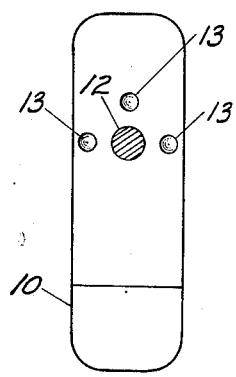
Fig. 3 is a view of the latching member, detached to show ball engaging recesses on the back thereof, for the different positions of same.
Figure 4:
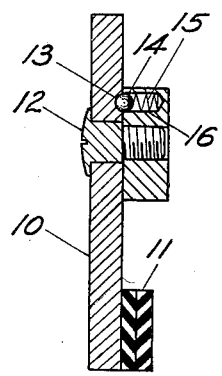
Fig. 4 is a fragmentary sectional view of the latch, on the center line thereof, showing a spring loaded ball engaging a recess, in yieldable registering position.

The body attaching member, shown in section by Fig. 2, has a split construction, consisting of the parts 17 and 18. The angular portions, of these two parts, engage within a drain channel, and are spaced in forced apart relation by floating threaded studs 19. These studs are set with head clearance below the surface of the part 17, and are free turning within the part 17, by means of collars, provided on the studs, and by retainer sleeves. These retainer sleeves are peened in at their outward margins, but permit free turning of studs, which are retentively held by reason of the collars. The part 18 is provided with a thin resilient pad 20, to give good gripping surface and so the body of the automobile is not marred. This pad is cemented to the part 18, and by its frictional grip, aids in firm securement to the drain channel. Threaded stud set screws 21, with heads flushing below the surface of part 17, engage the edge and under side of the drain channel, coacting with the angular portions of the parts 17 and 18, to form a firm engagement of the safety latch on the drain channel. With the adjustability available, it is easy to fit drain channels on different automobiles, in which there is some but not much variation. There is no need to damage the drain channel in any way, and the angular extension does not materially obstruct the flow of water. The parts 17 and 18 can be made from steel castings or could be made by die casting from a proper alloy. This might also be applied to other parts of the latch in its different forms.

From the foregoing, it is apparent how our automobile door safety latch is constructed. It must also be apparent, that it has many desirable features. It affords a simple and economical means of providing protection, so that children will not fall out through the opened doors of an automobile. It may be adapted to a car without any mechanical work on the car. It makes no difference which way the doors are hinged. Although needed principally for rear doors, because of chance that children in the back seat may open these doors and fall out, it may also be applied to the front door on opposite side to the driver or to any arrangement of doors whatsoever, since it is individually applied to any door without dependence on any other door. Of the latches, which have been devised, that are in the not-too-expensive class, it will be found, that same are dependent on the adjoining door for their locking, and in some cases, have mechanism in a mid-post common to latching of both doors. Our latches are manually operated individually, and although they cannot be unlatched by children within the automobile, still in case of accident or an emergency, they can be unlatched by an adult through an opened window. Also, the door can be forced open by an adult in case of accident, as there is a yielding of clamping action, when greater force is applied. With the more complicated locking, that has been devised, in which doors are locked by inter-connecting means, it may be impossible to be freed from the car in case of accident, and which might in some case include fire. Our latch is based on the broad idea of manually locking each door from the outside, irrespective of door arrangement, and with the utmost in safety under all conditions. It is not limited to a particular defined location, and has adjustability to fit variations in drain channels.

While we have shown and described a preferred form of our invention, it is obvious that many changes, which are within the scope of our invention, will be apparent to those skilled in the art. We therefore desire to be limited only by the scope of the appended claim.

What we claim is:

An automobile door safety latch comprising a latching member pivotally mounted on a body attaching member in proximity of an edge of a door, said latching member being manually operable and having a greater elongation at one end adapted to engage exterior of a door, a resilient pad secured to said end arranged for contact with said door, said latching member having a plurality of hemispherical recesses located on an arc of a circle concentric with its pivotal mounting on the side facing of said body attaching member said body attaching member having a face contacting said latching member, a bore into the said contacting face of said body attaching member, a spring loaded ball in said bore acting against the surface of said latching member and adapted to engage said hemispherical recesses in said latching member in defining active and neutral positions of said latching member, said body attaching member having an angular extension grippingly engaging within a drain channel of an automobile body, said angular extension being of split construction and expansible within said drain channel by a plurality of floating screw threaded elements joining said split construction, and a plurality of screw threaded elements in said body attaching member engaging said drain channel on the outside co-acting with said angular extension in a firm engagement with said drain channel.

SUBREY ABDALLAH.
FLORENCE A. ABDALLAH.

REFERENCES CITED

The following references are of record in the file of this patent:

UNITED STATES PATENTS

| Number | Name | Date |
|---|---|---|
| 381,740 | Wollensak | Apr. 24, 1888 |
| 646,239 | Schuyler | Mar. 27, 1900 |
| 1,515,091 | Brower et al. | Nov. 11, 1924 |